United States Patent
Pierschel

(10) Patent No.: US 11,320,330 B2
(45) Date of Patent: May 3, 2022

(54) ARRANGEMENT FOR A SEMICONDUCTOR-BASED PRESSURE SENSOR CHIP AND PRESSURE SENSOR CHIP HAVING A BRIDGE CIRCUIT OF TRANSISTORS

(71) Applicant: FIRST SENSOR AG, Berlin (DE)

(72) Inventor: Michael Pierschel, Berlin (DE)

(73) Assignee: FIRST SENSOR AG, Berlin (DE)

( * ) Notice: Subject to any disclaimer, the term of this patent is extended or adjusted under 35 U.S.C. 154(b) by 0 days.

(21) Appl. No.: 16/969,205

(22) PCT Filed: Feb. 1, 2019

(86) PCT No.: PCT/DE2019/100110
§ 371 (c)(1),
(2) Date: Aug. 12, 2020

(87) PCT Pub. No.: WO2019/158155
PCT Pub. Date: Aug. 22, 2019

(65) Prior Publication Data
US 2020/0408629 A1 Dec. 31, 2020

(30) Foreign Application Priority Data
Feb. 13, 2018 (DE) .................. 10 2018 103 180.7

(51) Int. Cl.
*G01L 9/00* (2006.01)
*G01L 9/06* (2006.01)

(52) U.S. Cl.
CPC .......... *G01L 9/0054* (2013.01); *G01L 9/0042* (2013.01); *G01L 9/06* (2013.01)

(58) Field of Classification Search
None
See application file for complete search history.

(56) References Cited

U.S. PATENT DOCUMENTS 5,481,905 A * 1/1996 Pratt ..................... G01L 9/0042
73/114.43
5,677,248 A * 10/1997 Sakai .................. H01L 21/3063
438/462

(Continued)

FOREIGN PATENT DOCUMENTS

EP  0 783 670 B1  4/2000
EP  2 485 028 A1  8/2012

OTHER PUBLICATIONS

International Search Report dated May 10, 2019 for PCT/DE2019/100110.

(Continued)

*Primary Examiner* — Peter J Macchiarolo
*Assistant Examiner* — Jermaine L Jenkins

(57) ABSTRACT

Provided is an arrangement for a semiconductor-based pressure sensor chip including: piezoresistive elements which are formed having an electrically doped channel in a layer arrangement in the region of a pressure membrane of a semiconductor substrate; an electrically conductive cover layer which is formed in the layer arrangement and is electrically insulated from the piezoresistive elements by an insulating layer; a bridge circuit of transistors, each of which are formed having one of the piezoresistive elements, wherein gate electrodes of the transistors are arranged in electrically doped layer regions in the electrically conductive cover layer, said layer regions being formed separately from one another; and a signal feedback, using which an output signal applied to the output of the bridge circuit is fed back in a signal-amplifying manner to one or more of the gate electrodes. Also provided is a pressure sensor chip.

15 Claims, 4 Drawing Sheets

(56) References Cited

U.S. PATENT DOCUMENTS

Figure 1:
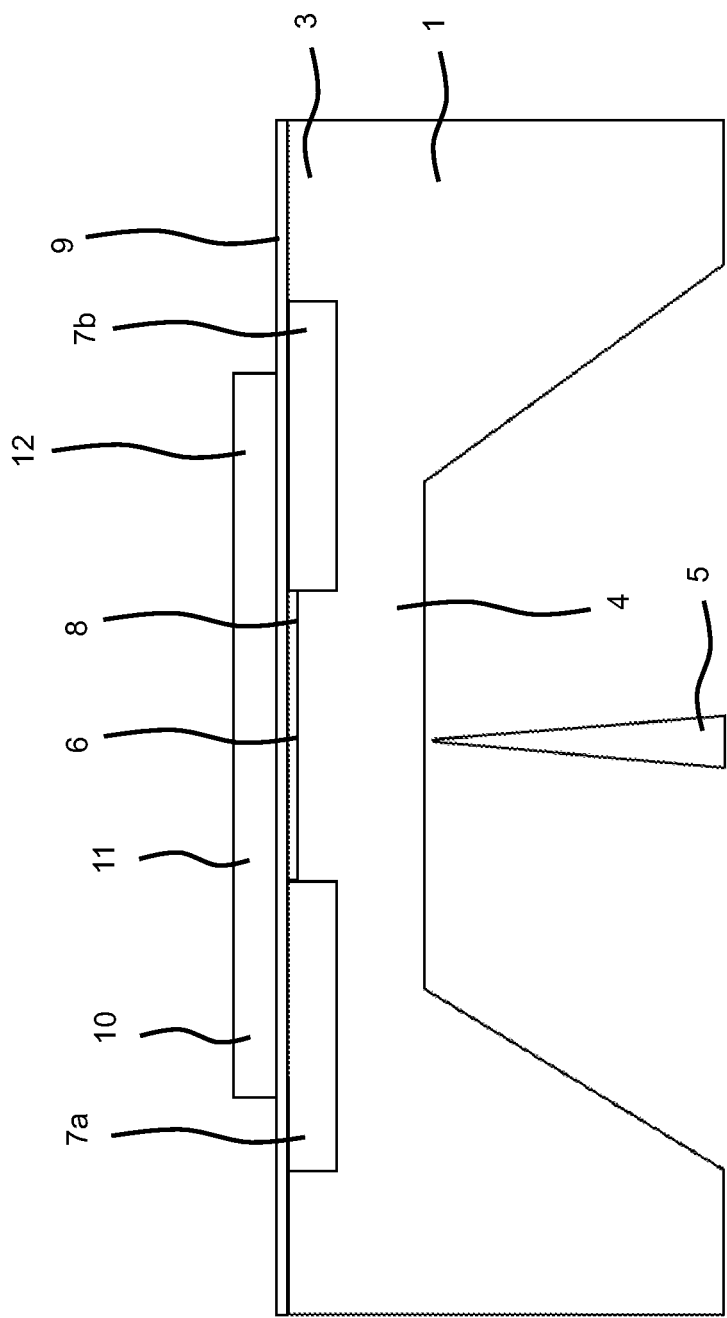

| | | | |
|---|---|---|---|
| 5,780,727 A | 7/1998 | Gimzewski et al. | |
| 6,769,299 B2* | 8/2004 | Forster | G01F 1/28 |
| | | | 73/204.26 |
| 2009/0036754 A1 | 2/2009 | Pons et al. | |
| 2012/0125113 A1* | 5/2012 | Liu | G01L 19/069 |
| | | | 73/721 |
| 2012/0125114 A1* | 5/2012 | Stewart | G01L 9/065 |
| | | | 73/721 |
| 2012/0198946 A1 | 8/2012 | Buesser | |
| 2013/0033323 A1* | 2/2013 | Scuderi | G01D 1/16 |
| | | | 330/257 |
| 2020/0049539 A1* | 2/2020 | De Luca | H01L 35/34 |

OTHER PUBLICATIONS

Written Opinion of the ISA dated May 10, 2019 for PCT/DE2019/100110.
International Preliminary Report on Patentability dated Aug. 18, 2020 for PCT/DE2019/100110.

\* cited by examiner

ARRANGEMENT FOR A SEMICONDUCTOR-BASED PRESSURE SENSOR CHIP AND PRESSURE SENSOR CHIP HAVING A BRIDGE CIRCUIT OF TRANSISTORS

CROSS-REFERENCE TO RELATED APPLICATIONS

This application claims priority to PCT Application No. PCT/DE2019/100110, having a filing date of Feb. 1, 2019, based on German Application No. 10 2018 103 180.7, having a filing date of Feb. 13, 2018, the entire contents both of which are hereby incorporated by reference.

FIELD OF TECHNOLOGY

The following relates to an arrangement for a semiconductor-based pressure sensor chip and a pressure sensor chip.

BACKGROUND

Semiconductor pressure sensors comprising piezoresistive elements are used in many applications of technology, medicine, automobiles and in mechanical engineering. In this case, semiconductor regions close to a chip surface are generally used by doping, which semiconductor regions generate signals by mechanical strain of the chip. These signals are usually not very strong. Bridge technologies, such as e.g. a Wheatstone bridge, are therefore used to make use of the signal differences arising on a chip.

To further increase the sensitivity of the structures, at least the center region of such a chip, in which the piezoresistive structures are located, is usually selectively thinned from the rear side. The remaining cover layer thickness, which is also called the membrane thickness, often determines the overall sensitivity of such a chip.

However, very small membrane thicknesses are technically difficult to produce in a reproducible manner. The existing solutions are therefore often not sufficient for measuring very small pressure differences.

To improve the mechanical properties and the hysteresis of the acquired signals, such chips often have additional cover layers, also on top of the piezoresistive structures, which layers are usually located in the semiconductor substrate. Normally there are always insulating cover layers in order to technically control the generating properties of the semiconductor substrate. Cover layers lying above these can also lie on top of the structures as an insulator or also as a conductive layer, for example as a metal layer or as a doped polysilicon layer or as conductive ITO layer ("indium tin oxide").

EP 0 783 670 B1 discloses an electromechanical transducer comprising piezoresistive elements which are formed in a semiconductor substrate and have an electrically doped channel.

EP 2 485 028 A1 discloses a pressure sensitive amplifier stage having four unipolar pressure sensor transistors, each having a piezoresistive current path, which are interconnected as a pressure measuring bridge having two bridge arms which each have a first and a second pressure sensor transistor connected in series with respect to their current paths. There are furthermore two unipolar control transistors, each having a gate terminal and a current path extending between an additional first connection and an additional second connection. The first and the second connections of the control transistors are, in this case, each connected in pairs, and the gate terminals of the control transistors are each connected to a node between the pressure sensor transistors of the two bridge arms. The interconnected second connections of the two control transistors connected in parallel are connected to the gate terminals of the second pressure sensor transistors of the two bridge arms. The amplifier stage furthermore has two power sources. An input operating voltage can be applied to the gate terminals of the first pressure sensor transistors of the two bridge arms, and a measurement output voltage can be picked up between the respective pressure sensor transistors of the two bridge arms, the measurement output voltage of the pressure measuring bridge being applied to an additional pressure measuring bridge via the gate terminals of the first pressure sensor transistors of the two bridge arms so as to cascade the pressure measuring bridges.

SUMMARY

An aspect relates to an improved design for a semiconductor-based pressure sensor chip and a pressure sensor chip, in order to increase the measuring sensitivity of the pressure sensors.

According to one aspect, an arrangement for a semiconductor-based pressure sensor chip is provided having piezoresistive elements formed having an electrically doped channel in a layer arrangement in the region of a cover membrane of a semiconductor substrate. An electrically conductive cover layer, which is electrically insulated from the piezoresistive elements by an insulating layer, is provided in the layer arrangement. One bridge circuit has transistors, each formed having one of the piezoresistive elements, gate electrodes of the transistors being arranged in the electrically conductive cover layer in electrically doped layer regions which are separate from each other. This arrangement additionally has a signal feedback, by which an output signal applied to the output of the bridge circuit is fed back to one or more of the gate electrodes of the transistors of the bridge circuit.

According to another aspect, a pressure sensor chip having such an arrangement is provided.

The bridge detuning initially caused by mechanical strain is amplified by the suggested signal feedback to the bridge circuit itself. An increased measurement sensitivity is thus provided.

The electrical resistance, i.e. the electrical conductivity, of the electrically doped channel of the piezoresistive elements is changeable due to mechanical strain of the associated region of the pressure membrane. If pressure is applied to the pressure membrane, it deforms, whereby the electrical conductivity of the associated electrically doped channel is changed.

The electrical resistance of the electrically doped channel is furthermore changeable by controlling the gate electrode of the transistor associated with the piezoresistive element.

The insulating layer in the layer arrangement forms gate electrode insulation with respect to the structures in the semiconductor substrate, in particular with respect to the electrically doped channel.

By the proposed configuration of the signal feedback, the output signal applied to an output of the bridge circuit is fed back to one or more of the gate electrodes in a signal-amplifying manner on the arrangement of the transistors forming the bridge circuit (i.e. on the bridge circuit itself).

The gate electrodes can be connected separately to outputs of the bridge circuits for feedback. The gate electrodes can alternatively be connected in pairs to the output of the bridge circuit.

The transistors can each be formed having a metal oxide semiconductor structure, in which the electrically doped channel of the piezoresistive elements is configured as a metal oxide semiconductor channel.

The bridge circuit of the semiconductor-based pressure sensor chip consists of the four transistors. This particularly means that the signal feedback in the bridge circuit is free of additional transistors. It is thereby possible for the signal feedback in the bridge circuit to be free of additional transistors on the pressure sensor chip.

The pressure sensor chip can be configured having just one single arrangement, in which the transistor arrangement of the bridge circuit is formed by the (just) four transistors.

The signal feedback can include a signal preprocessor, which is configured to prepare the output signal applied to the output of the bridge circuit prior to feed back. The signal preprocessor can comprise an electrical filtering device configured to filter the output signal to be fed back before the feedback. The signal preprocessor can comprise a compensating device configured to process the output signal to be fed back before the feedback, so that non-linearities in the path of the output signal are eliminated over the temperature or the pressure range to be recorded, for example non-linearities due to temperature influences and/or other influences.

The gate electrodes can couple in pairs to the signal preprocessor.

The gate electrodes can couple separately to the signal preprocessor. Individually adjusted feedback signals can, in this way, be provided to the gate electrodes of the various transistors.

The signal preprocessor can have circuit elements which shift or adjust an operating point and are each associated with one of the transistors and configured to set the relevant operating point of the transistors. Differences concerning the operating point of the transistors can be compensated in this way.

The gate electrodes of the transistors can be in the electrically conductive semiconductor layer made of doped polysilicon. The semiconductor materials InP or GaAsP can alternatively be used. The output of the bridge circuit can be formed having a positive and a negative output, to which the output signal is symmetrically applied a positive and a negative output signal. It is possible for the positive signal to be fed back to the gate electrodes of two of the transistors, and for the negative output signal to be fed back to the other two of the transistors.

In the case of the piezoresistive elements, the doped channel can be arranged between electrically doped regions and conductively connected to said regions, the doped channel being contactable to the outside via the doped regions. The doped regions can be electrically connected to contact points or connection points for the purpose of establishing electrical contact. The doped regions can have a higher level of doping, i.e. a higher dopant concentration, than the doped channel. The sheet resistance of the piezodopings, here called the doped channel, can be, for example, approximately 900 ohms per square. The electrical resistance of the doped regions can be approximately 25 to approximately 30 ohms per square. The corresponding concentrations of the dopant can thus differ by at least a factor of approximately 30.

The (electrically) doped channel can be in contact with the doped regions.

The electrically doped layer regions in which the gate electrodes are formed can overlap with the electrically doped regions, facing a flat side of the pressure membrane. The electrically doped layer regions can overlap at least 50 percent of the surface of the electrically doped regions.

The arrangements previously described in connection with the arrangement can accordingly be provided in conjunction with the pressure sensor chip. In doing so, the signal preprocessor can be integrated into the pressure sensor chip (on-chip) or using circuit elements that are outside of the pressure sensor chip (off-chip), in particular using those described in previous examples.

In connection with the present disclosure, the term doping refers to electrical doping, by which the electrical conductivity of the doped material is altered or modulated.

In one embodiment, an (extra) connection of the relevant electrode can be provided for all (four) transistors of the bridge circuit for purposes of so-called "level shifting". An external signal preprocessor, i.e. for example a signal processor outside of the pressure sensor chip having the bridge circuit, can be configured to either supply an output signal, which is suitable for the DC-operating point, equally to all transistors of the bridge circuit, or the two output signals of the bridge circuit are each altered by a circuit for shifting the operating point level so that four different desired signals are generated.

BRIEF DESCRIPTION

Figure 2:
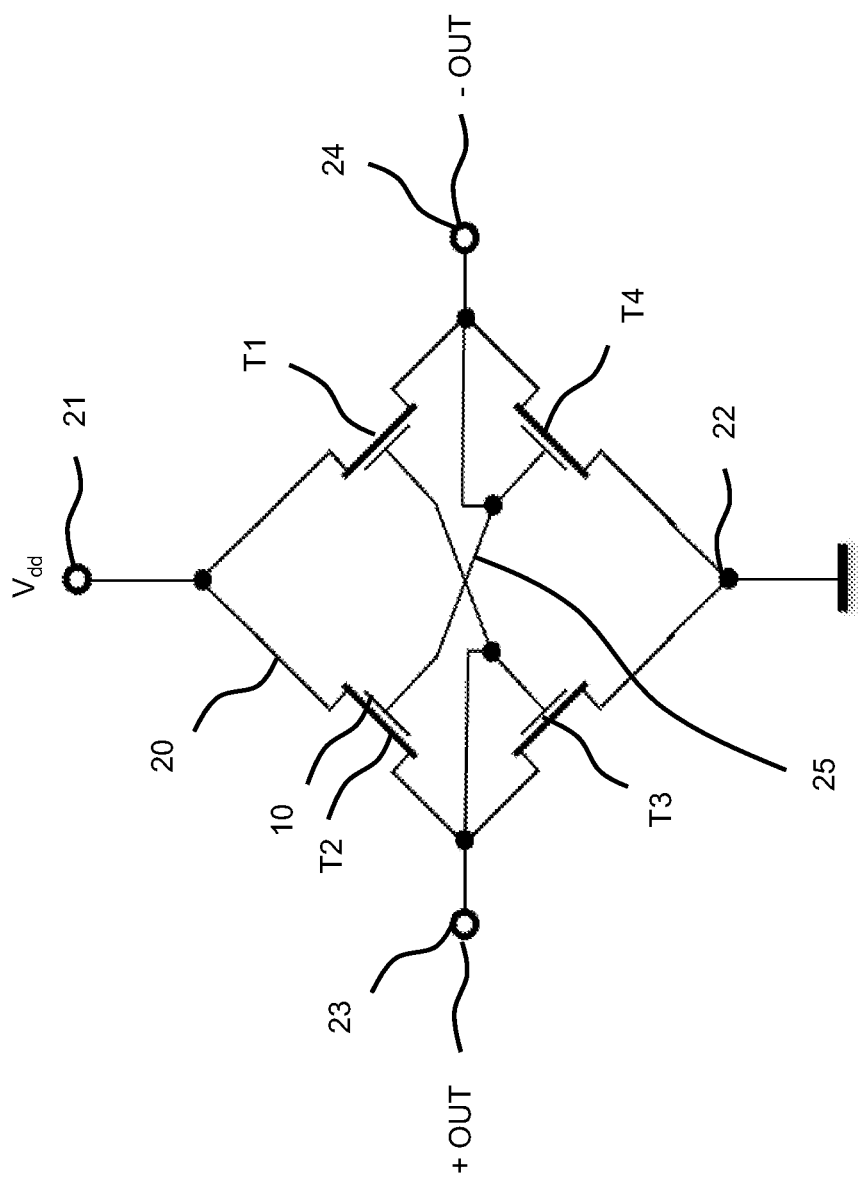
Figure 3:
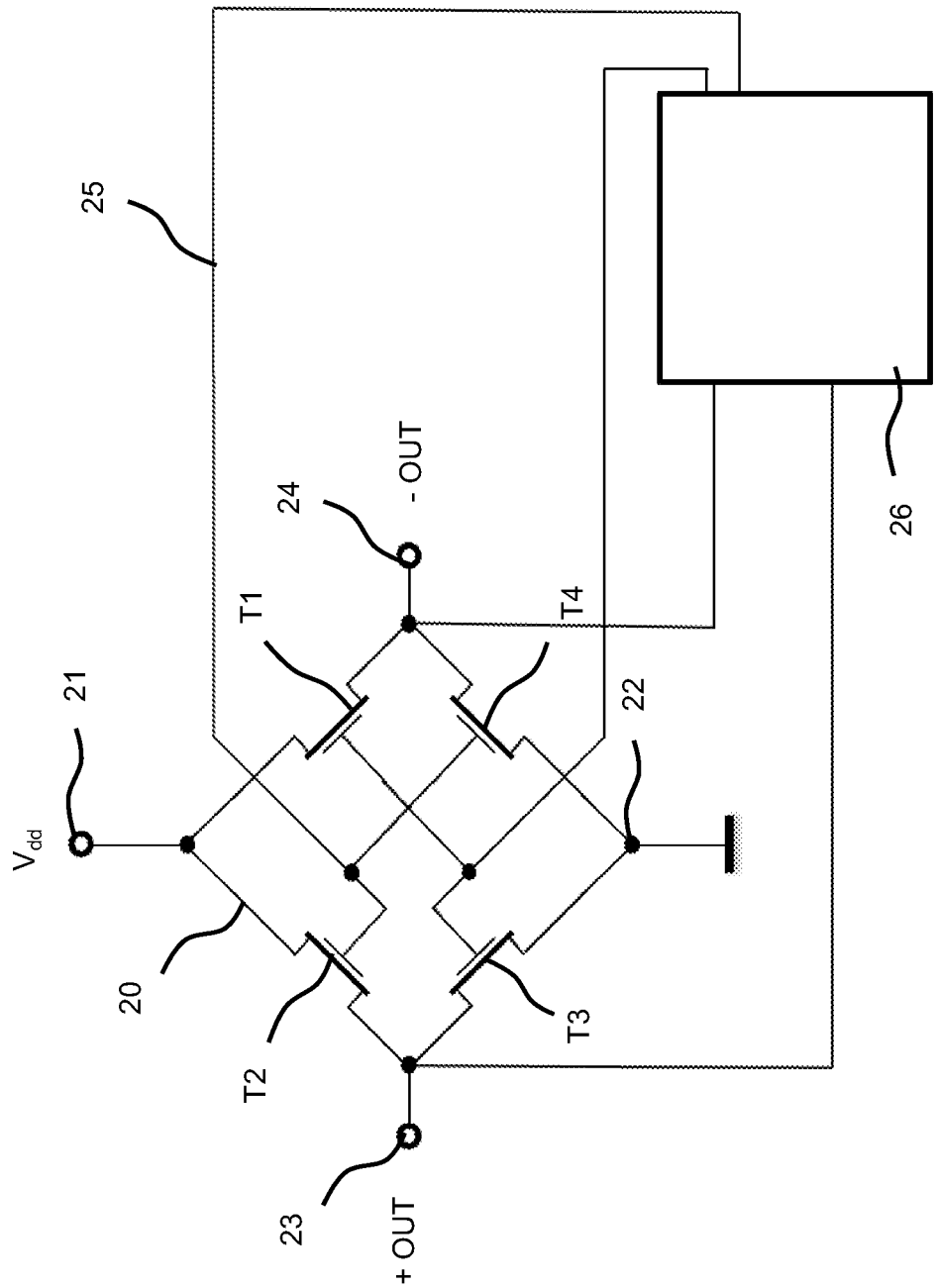
Figure 4:
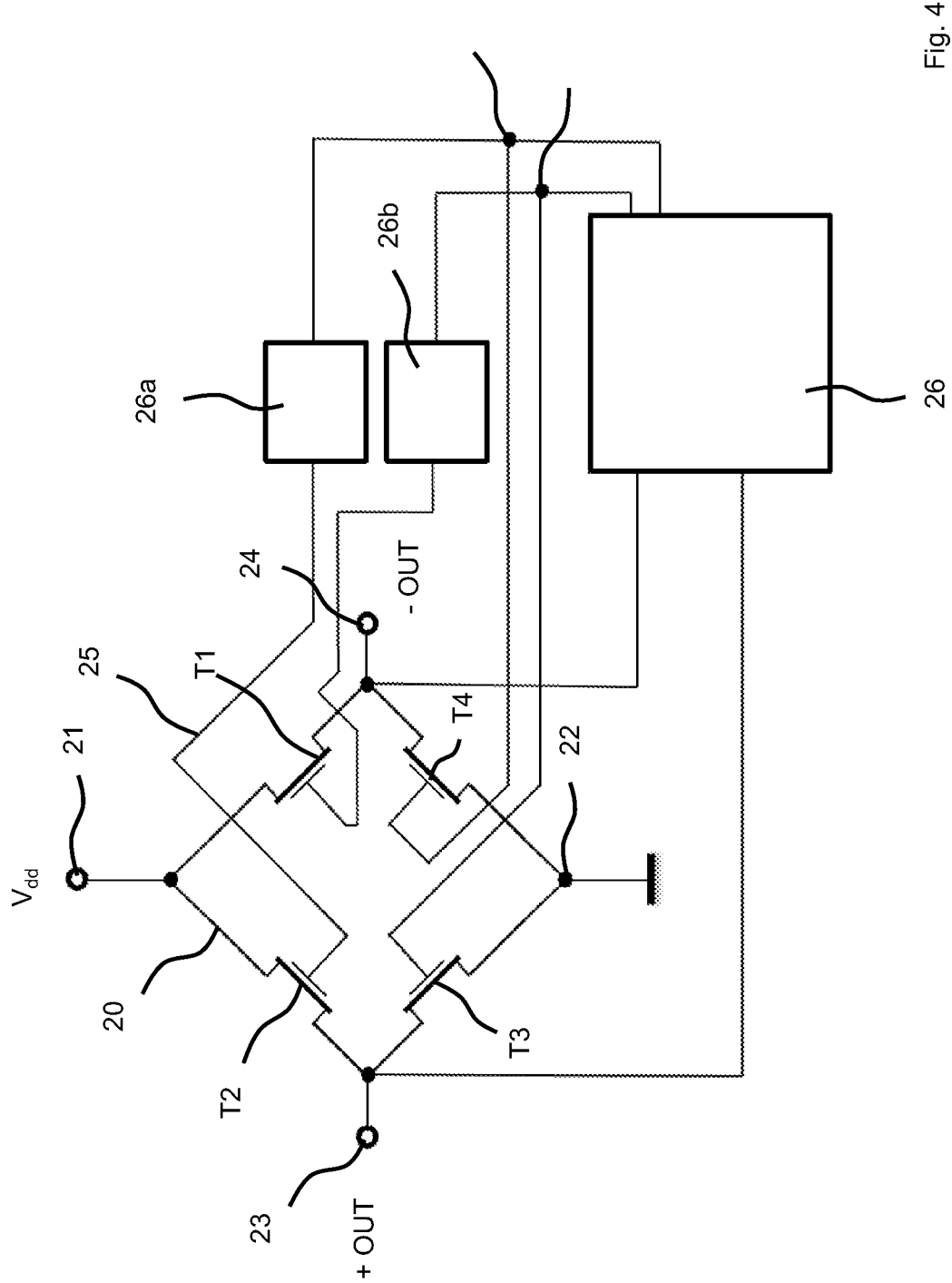

Some of the embodiments will be described in detail, with references to the following Figures, wherein like designations denote like members, wherein:

FIG. 1 a schematic representation of a design for a semiconductor-based pressure sensor chip in cross section;

FIG. 2 a schematic representation of a bridge circuit having transistors for a pressure sensor chip;

FIG. 3 a schematic representation of another bridge circuit having transistors for a pressure sensor chip, wherein an external signal preprocessor is provided; and FIG. 4 a schematic representation of another bridge circuit having transistors for a pressure sensor chip, wherein an external signal preprocessor which couples separately to gate electrodes of the transistors, is provided.

DETAILED DESCRIPTION

FIG. 1 is a schematic representation of an arrangement for a semiconductor-based pressure sensor chip in cross section, comprising a semiconductor substrate 1 on which a pressure membrane 4 is formed in a region 2 of a layer arrangement 3. An arrow 5 indicates schematically an application of pressure to the pressure membrane 4 from below. It is alternatively possible for pressure to act on the pressure membrane 4 from above via a medium.

An electrically doped channel 6 into which electrical doping is introduced is formed in the layer arrangement 3. The electrically doped channel 6 extends between electrically doped regions 7a, 7b, via which the electrically doped channel 6 is electrically contactable from the outside, in particular via contact points or pads (not shown). A piezoresistive element 8 is formed having the electrically doped channel 6, the electrical conductivity (resistance) of which element changes if the pressure membrane 4 is subjected to pressure, which leads to a mechanical deformation of the pressure membrane 4. Such a piezoelectric effect is known per se.

An electrically insulating layer 9, which, in the embodiment shown here, covers the electrically doped channel 6 as well as the electrically doped region 7a, 7b and insulates them from the gate electrode 10, is arranged on the semiconductor substrate 1 in the layer arrangement 3. The gate electrode 10 is part of a transistor 11 comprising the gate electrode 10, the electrically doped channel 6, as well as the electrically insulating layer 9, by which gate electrode insulation is provided.

Four of the structures shown in FIG. 1, each of which has a structure comprising the piezoresistive element 8 as well as the associated gate electrode 10, can be provided to form a semiconductor-based pressure sensor chip. The gate electrodes 10 can then be formed as separate, electrically doped layer regions in an electrically conductive semiconductor layer 12 of the layer arrangement 3, which can also be called a cover layer. This layer can alternatively consist of a metal material, which can be used to form the gate electrodes 10.

FIGS. 2 to 4 show various embodiments of a bridge circuit 20 having four transistors T1, ..., T4, with each of which a piezoresistive element 8 as well as a gate electrode 10 is associated.

An operating voltage $VR_{dd}R$ is applied via connections 21, 22 of the bridge circuit 20. An output signal with positive and negative signals is applied symmetrically to the outputs 23, 24. The signal picked up by the outputs 23, 24 is fed back to the gate electrodes 10 of the transistors T1, ..., T4 via a signal feedback 25. The bridge detuning which arises when pressure is applied is increased as a result.

In the embodiment of the bridge circuit 20 shown in FIG. 2, the signal feedback 25 is located on the pressure sensor chip itself. In accordance with the shown embodiment, the signal feedback is configured to be free of (additional or further) transistors, optionally also free of other (active) circuit elements, so that the bridge circuit 20 only has the four transistors T1, ..., T4.

FIG. 3 alternatively shows an embodiment in which the signal feedback 25 has an external signal preprocessor 26, which is either additionally arranged on a pressure sensor chip or is formed by an additional chip outside of the pressure sensor chip. In the embodiment of FIG. 3, the gate electrodes 10 are coupled in pairs to outputs of the external signal preprocessor 26.

In the embodiment shown in FIG. 4, the gate electrodes 10 of the transistors T1, ..., T4 couple separately to the external signal preprocessor 26 via additional circuit elements 26a, 26b. This allows operating point voltages for the transistors T1, ..., T4 to be adjusted separately in conjunction with the amplifying signal feedback.

Additional aspects are explained below.

In the basic arrangement according to FIG. 2, the positive electrical signals of the output (+ OUT) of the bridge circuit 20 on the chip can be applied to the gate electrodes 10 of the transistors T1, T3 in the right and left arms of the bridge circuit 20, and the negative signals (− OUT) are connected to the gate electrodes 10 of the other remaining transistors T2, T4. This makes it possible for the initial output signals (bridge detuning) generated by piezoresitivity to be amplified. This results systematically in a higher offset of the obtained output signals of the bridge circuit 20 in the case of a comparable mechanical input signal and a comparable membrane thickness.

According to FIG. 3, the bridge signals can alternatively first be transmitted to the external signal preprocessor 26 via an external signal processor or similar automatic machine, which performs signal preprocessing and possible corrections concerning linearity, characteristic curves and/or temperature, and whose output signals are then connected to the gate electrodes 10 on the chip via the piezo structures having the piezoresistive elements 8. It is possible, in this case as well, to achieve a further signal amplification in the pressure sensor chip and thus a significantly higher sensitivity of the sensor chip.

The magnitude of the possible signal amplification depends on the doping level of the piezoresistive elements 8 as well as the thickness of the electrically insulating layer 9 acting as a gate insulator between the conductive layer of the gate electrode 10 and the semiconductor substrate 1. The transmission function of an internal or external signal processing circuit 26 also affects the possible overall sensitivity of such a system.

If the gate electrodes 10 are produced in a layer made of polysilicon, an individual region, which is produced separately from the other regions of the other gate electrodes, is assigned to each of the gate electrodes. There are thus at least four individual structures (transistors) directly on the chip that are connected individually or in pairs to the corresponding outputs of the bridge circuit 20.

The transistors T1, T2, T3 or T4 can be configured as MOS structures (metal oxide). Two signal inputs are typically provided. The first signal input, with influence on the resistance of the electrically doped channel 6, is the piezo sensitivity. In this case, the conductivity (resistance) of the electrically doped channel 6, for example the MOS channel, is modulated by mechanical strain. The second signal input is the relevant gate electrode 10 of the structure, which can likewise alter the conductivity of the channel resistance by electrical control.

An initial modulation by the piezoresistive input will thus initially generate a symmetric output signal at +OUT and −OUT, which is then fed back to the gate electrodes 10, resulting in an amplification of the output signal at +OUT and −OUT. The magnitude of this additional amplification of the output signals at +OUR and −OUT depends on the exact choice of the channel doping in the electrically doped channel 6, its depth in the crystal and the concentration, as well as the thickness and type of the gate insulator by which the gate electrode 10 is insulated from the electrically doped channel 6.

An external signal processor can be provided in order to, for example, perform filter functions and/or to compensate for non-linearities in the characteristic curves, e.g. concerning the temperature or other influences of the overall structure.

In addition, the phenomenon of so-called "level shifting", which is known per se, can still arise. The two upper transistors T1, T2 of the bridge circuit 20 usually do not receive the same DC operating point voltage at the gate as the lower two transistors T3, T4 because their source/drain potentials clearly differ. An extra connection of the respective gate electrode 10 can therefore be provided for all four transistors T1, ..., T4. The external signal preprocessor 26 either provides the output signal suitable for the DC-operating point equally for all four transistors T1, ..., T4, or the two shown output signals are each additionally altered by a circuit for shifting the operating point level 26a, 26b so that the four different desired signals are generated as shown in FIG. 4.

Since the distance between the start of the pressure membrane 4 and the electrically doped channel 6 with which the piezoresistive element 8 is formed is often not yet precisely defined in the initial design of the chip, an element shown separately here as a transistor can also consist of two or more channel regions connected in series. These are then usually at different distances from the outer start of the region of the pressure membrane 4, so that at least one of these regions receives the maximum piezo signal by a then optimal bridge detuning. The other channel regions are then all in series therewith. And they can all, of course, have been configured separately as a transistor having a common or a separate gate electrode. These transistors of a bridge arm, which are connected in series, then all receive the same gate potential.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. An arrangement for a semiconductor-based pressure sensor chip, comprising:
    piezoresistive elements that are formed having an electrically doped channel in a layer arrangement in the region of a pressure membrane of a semiconductor substrate;
    an electrically conductive cover layer that is formed in the layer arrangement and is electrically insulated from the piezoresistive elements by an insulating layer;
    a bridge circuit of transistors, each formed by one of the piezoresistive elements, wherein gate electrodes of the transistors are arranged in electrically doped layer regions in the electrically conductive cover layer, which layer regions are formed separately from each other; and
    a signal feedback, by which an output signal applied to the output of the bridge circuit is fed back to one or more of the gate electrodes of the transistors of the bridge circuit in a signal amplifying manner.

2. The arrangement according to claim 1, wherein for purposes of feedback, the gate electrodes are separately connected to the outputs of the bridge circuit.

3. The arrangement according to either claim 1, wherein the transistors are each formed having a metal oxide semiconductor structure, in which the electrically doped channel of the piezoresistive elements is configured as a metal oxide semiconductor channel.

4. The arrangement according to claim 1, wherein the signal feedback has a signal preprocessor which is configured to prepare the output signal applied to the output of the bridge circuit before said signal is fed back.

5. The arrangement according to claim 4, wherein the gate electrodes couple to the signal preprocessor in pairs.

6. The arrangement according to claim 4, wherein the gate electrodes couple to the signal preprocessor separately.

7. The arrangement according to claim 6, wherein the signal preprocessor has circuit elements which shift the operating point and which are each associated with one of the transistors and are configured to set the operating point of the transistors.

8. The arrangement according to claim 1, wherein the gate electrodes of the transistors are in the electrically conductive cover layer made of electrically doped polysilicon.

9. The arrangement according to claim 1, wherein the output of the bridge circuit is formed having a positive and a negative output, to which the output signal is symmetrically applied as a positive and a negative output signal.

10. The arrangement according to claim 1, wherein in the case of the piezoresistive elements, the electrically doped channel is arranged between electrically doped regions and is electrically connected to the latter, the electrically doped channel being contactable to the outside via the electrically doped regions.

11. The arrangement according to claim 10, wherein the electrically doped channel is in contact with the electrically doped regions.

12. The arrangement according to claim 10, wherein the electrically doped layer regions in which the gate electrodes are formed face a flat side of the pressure membrane and overlap the electrically doped regions.

13. A pressure sensor chip comprising an arrangement according to claim 1.

14. The pressure sensor chip according to claim 13, wherein a signal preprocessor, which is configured to prepare an output signal before it is fed back, is on-chip.

15. The pressure sensor chip according to claim 13, wherein a signal preprocessor, which is configured to prepare an output signal before it is fed back, is off-chip.

* * * * *